US011852371B2

(12) United States Patent
Fukushima et al.

(10) Patent No.: US 11,852,371 B2
(45) Date of Patent: Dec. 26, 2023

(54) VENTILATION DEVICE

(71) Applicant: DAIKIN INDUSTRIES, LTD., Osaka (JP)

(72) Inventors: Wataru Fukushima, Osaka (JP); Kanako Bando, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/325,573

(22) Filed: May 30, 2023

(65) Prior Publication Data

US 2023/0304701 A1 Sep. 28, 2023

Related U.S. Application Data

(63) Continuation of application No. PCT/JP2021/041658, filed on Nov. 12, 2021.

(30) Foreign Application Priority Data

Nov. 30, 2020 (JP) .................................. 2020-198314

(51) Int. Cl.
*F24F 13/20* (2006.01)
*F24F 11/00* (2018.01)
*F24F 7/00* (2021.01)

(52) U.S. Cl.
CPC ............... *F24F 13/20* (2013.01); *F24F 7/00* (2013.01); *F24F 11/0001* (2013.01)

(58) Field of Classification Search
CPC ........... F24F 13/20; F24F 7/00; F24F 11/0001
(Continued)

(56) References Cited

U.S. PATENT DOCUMENTS

| 3,909,589 | A | * | 9/1975 | Stone | .................. | F21V 33/0092 |
| | | | | | | 392/347 |
| 11,073,301 | B2 | * | 7/2021 | Singh | .................... | F24F 12/001 |
| 11,079,120 | B2 | * | 8/2021 | Zhou | ...................... | F24F 1/005 |

FOREIGN PATENT DOCUMENTS

| JP | S56074233 U | 6/1981 |
| JP | S56074234 U | 6/1981 |

(Continued)

OTHER PUBLICATIONS

International Search Report issued in corresponding International Application No. PCT/JP2021/041658; dated Jan. 25, 2022 (3 pages).

(Continued)

*Primary Examiner* — Avinash A Savani
*Assistant Examiner* — Dana K Tighe
(74) *Attorney, Agent, or Firm* — Osha Bergman Watanabe & Burton LLP

(57) ABSTRACT

A ventilation device to be installed outdoors, includes: a casing; a heat exchanger accommodated in the casing and configured to perform heat exchange between outdoor air flowing indoors and indoor air flowing outdoors; an electric component unit including a control board and accommodated in the casing; and a fastener fixing, to the casing, an electric wire connected to the electric component unit. The heat exchanger is extractable sideward from the casing. The electric component unit is disposed above a projection region of the heat exchanger extracted from the casing. The casing includes a lead-out port disposed below the projection region and through which the electric wire is led out of the casing. The fastener is disposed between the electric component unit and the lead-out port. The electric wire fixed by the fastener is routed around the projection region.

8 Claims, 12 Drawing Sheets

(58) Field of Classification Search
USPC .......................................................... 454/237
See application file for complete search history.

(56) References Cited

FOREIGN PATENT DOCUMENTS

| | | |
|---|---|---|
| JP | H09196576 A | 7/1997 |
| JP | 2004191033 A | 7/2004 |
| JP | 2014020768 A | 2/2014 |
| JP | 2014163549 A | 9/2014 |
| JP | 2015129621 A | 7/2015 |
| JP | 2016061470 A | 4/2016 |
| JP | 2019056515 A | 4/2019 |
| JP | 2019074219 A | 5/2019 |
| WO | 2018225224 A1 | 12/2018 |

OTHER PUBLICATIONS

International Preliminary Report on Patentability issued in corresponding International Application No. PCT/JP2021/041658; dated May 30, 2023 (6 pages).

* cited by examiner

FIG. 6A
FIG. 6B
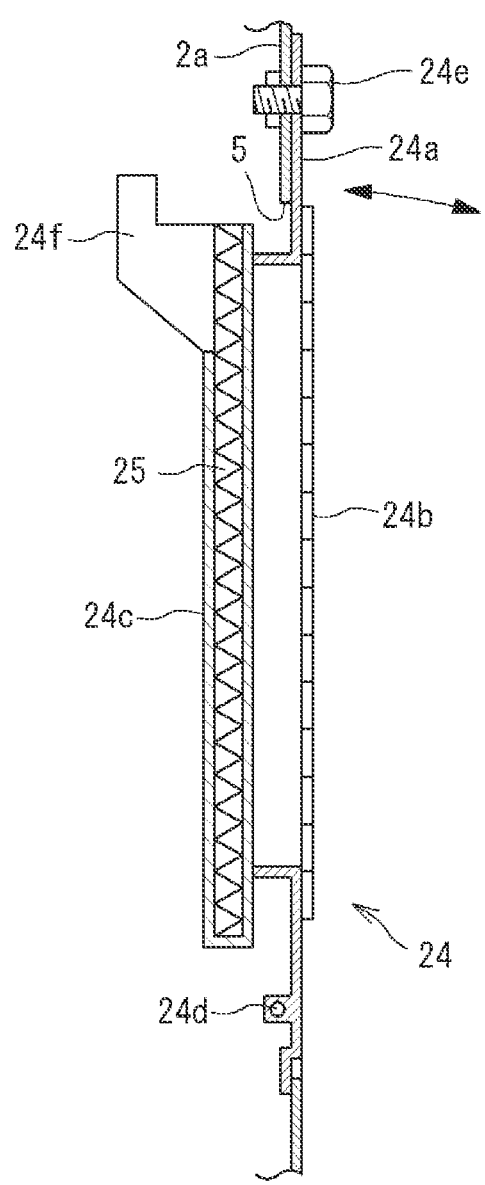
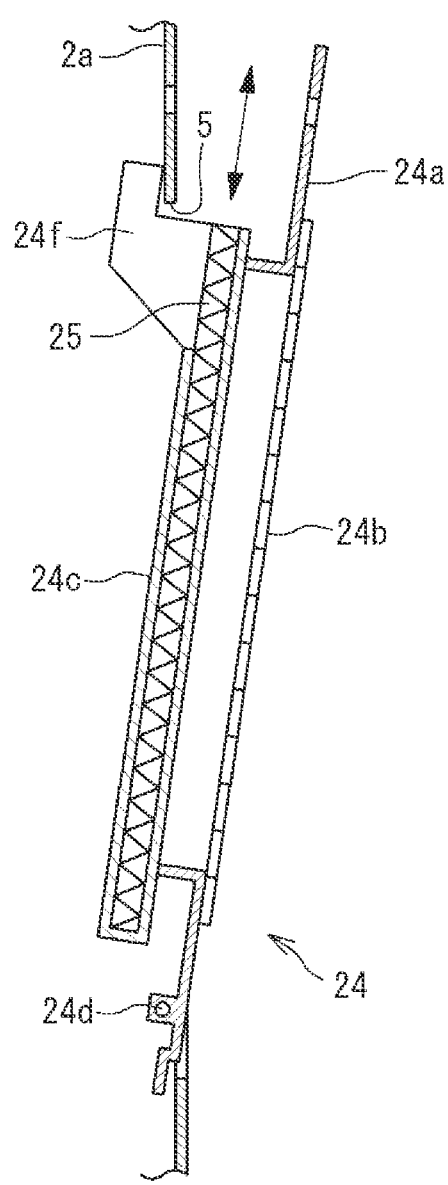

VENTILATION DEVICE

TECHNICAL FIELD

The present disclosure relates to a ventilation device.

BACKGROUND

Patent Literature 1 discloses a ventilation device to be installed outdoors. This ventilation device includes an exhaust fan, an air supply fan, a heat exchanger, and a casing accommodating these components. The casing includes a lower stage portion where the exhaust fan is placed, an upper stage portion where the air supply fan is placed, and a middle stage portion where the heat exchanger is placed. The casing has an exhaust air port bored in its front surface and located at the lower stage portion, a return air opening and a supply air opening each bored in its rear surface and located at the upper stage portion, and outside air ports respectively bored in its left and right side surfaces and located at the middle stage portion.

According to the ventilation device disclosed in Patent Literature 1, when the air supply fan operates, outdoor air flows into the casing through the outside air port, and then flows through the heat exchanger. The air is then guided indoors through the supply air opening. When the exhaust fan operates, indoor air flows into the casing through the return air opening, and then flows through the heat exchanger. The air is then discharged outdoors through the exhaust air port. The heat exchanger performs heat exchange between the outdoor air and the indoor air to suppress indoor temperature changes owing to the air to be supplied indoors.

PATENT LITERATURE

PATENT LITERATURE 1: Japanese Laid-Open Patent Publication No. 2014-20768

SUMMARY

The present disclosure provides a ventilation device to be installed outdoors,
the ventilation device including:
a casing;
a heat exchanger accommodated in the casing and configured to perform heat exchange between outdoor air flowing indoors and indoor air flowing outdoors;
an electric component unit accommodated in the casing; and
a fixing member fixing, to the casing, an electric wire connected to the electric component unit,
wherein
the heat exchanger is extractable sideward from the casing,
the electric component unit is disposed above a projection region of the heat exchanger extracted from the casing,
the casing has a lead-out port through which the electric wire is led out of the casing, the lead-out port located below the projection region, and
the fixing member is disposed between the electric component unit and the lead-out port to fix the electric wire routed around the projection region.

BRIEF DESCRIPTION OF THE DRAWINGS

FIGS. 6A and 6B are sectional views of a main outside air intake port and its surroundings.

DETAILED DESCRIPTION

Hereinafter, embodiments of the present disclosure will be described in detail with reference to the accompanying drawings.

Figure 1:
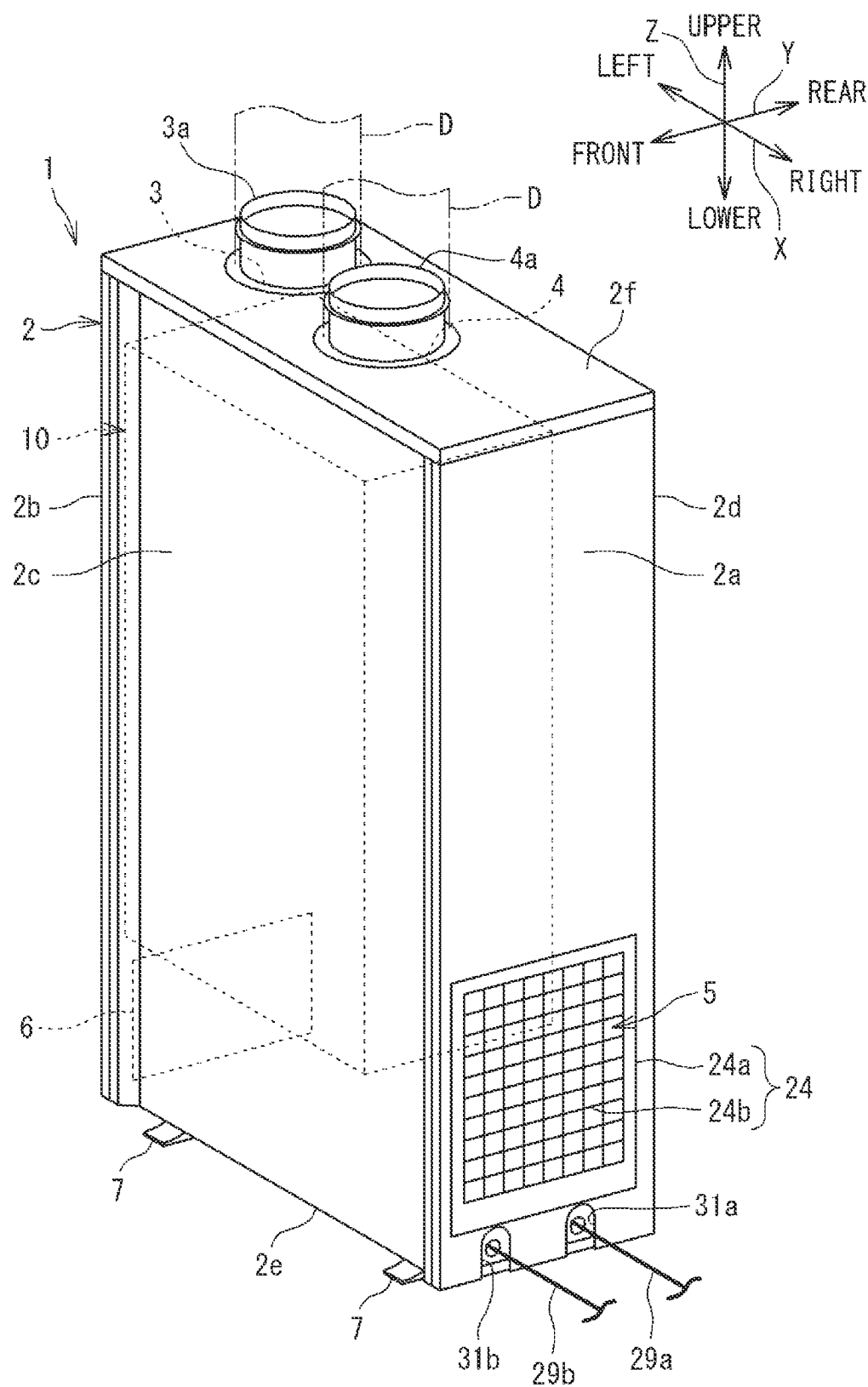
FIG. 1 is a perspective view of a ventilation device according to one or more embodiments of the present disclosure.

FIG. 1 is a perspective view of a ventilation device according to one or more embodiments of the present disclosure.

In the following description, the terms "upper", "lower", "front", "rear", "left", and "right" are indicated by arrows illustrated in FIGS. 1 to 3 in conjunction with these terms. Particularly in FIG. 1, a first direction indicated by an arrow X is defined as a left-and-right direction, a second direction indicated by an arrow Y is defined as a front-and-rear direction, and a third direction indicated by an arrow Z is defined as an up-and-down direction. However, these definitions are merely exemplary. For example, the first direction X may be regarded as the front-and-rear direction and the second direction Y may be regarded as the left-and-right direction.

The ventilation device 1 is configured to exchange air in a building (i.e., air in a room) with air outside the building (i.e., air outside the room), thereby providing ventilation of air in the building. The ventilation device 1 is installed outside the building. The ventilation device 1 is connected to the inside of the building with two ducts D. The ventilation device 1 includes a main casing (a first casing) 2 having a rectangular parallelepiped box shape. The ventilation device 1 according to one or more embodiments includes an auxiliary casing 13 (to be described later) in addition to the main casing 2.

The main casing 2 includes a bottom plate 2e, a top plate 2f, a right side plate 2a, a left side plate 2b, a front side plate 2c, and a rear side plate 2d. The bottom plate 2e and the top plate 2f each have a rectangular shape in plan view and are opposite to each other with a spacing in between in the up-and-down direction. The right side plate 2a, the left side plate 2b, the front side plate 2c, and the rear side plate 2d connect the four sides of the bottom plate 2e and the four sides of the top plate 2f, respectively.

The top plate 2f of the main casing 2 has a main return air intake port (a second return air intake port) 3 and a main air supply port (a second air supply port) 4. A tubular body 3a and a tubular body 4a are respectively mounted to the main return air intake port 3 and the main air supply port 4. The tubular bodies 3a and 4a are respectively connected to one ends of the ducts D. The other ends of the ducts D are connected to the inside of the building. That is, the main return air intake port 3 and the main air supply port 4 communicate with the inside of the building via the ducts D.

The bottom plate 2e of the main casing 2 is provided with a pair of legs 7. The ventilation device 1 is installed outside the building in such a manner that the ventilation device 1 is fastened using bolts or the like with the legs 7 mounted on the ground. The ventilation device 1 is not necessarily placed on the ground. For example, the ventilation device 1 may be placed on a pedestal mounted to, for example, an outer wall of the building or the roof of the building.

The right side plate 2a of the main casing 2 has a main outside air intake port (a second outside air intake port) 5. The left side plate 2b of the main casing 2 has a main exhaust port (a second exhaust port) 6.

The main casing 2 accommodates a ventilation device main body 10. The ventilation device main body 10 according to one or more embodiments is a known ventilation device designed to be installed in an attic or hung on a wall surface in a building. The ventilation device 1 according to the present disclosure is designed to be installed outdoors in such a manner that a ventilation device designed to be installed indoors is accommodated in the main casing 2. Ventilation devices designed to be installed indoors are not exposed to rain unlike ventilation devices designed to be installed outdoors; therefore, due consideration concerning waterproofness is not given to the ventilation devices designed to be installed indoors. In view of this, the ventilation device 1 according to the present disclosure is installable outdoors in such a manner that a ventilation device designed to be installed indoors is accommodated in the main casing 2 excellent in waterproofness. As a matter of course, the ventilation device 1 according to the present disclosure may employ a ventilation device designed to be installed only outdoors, rather than the ventilation device designed to be installed indoors.

Figure 2:
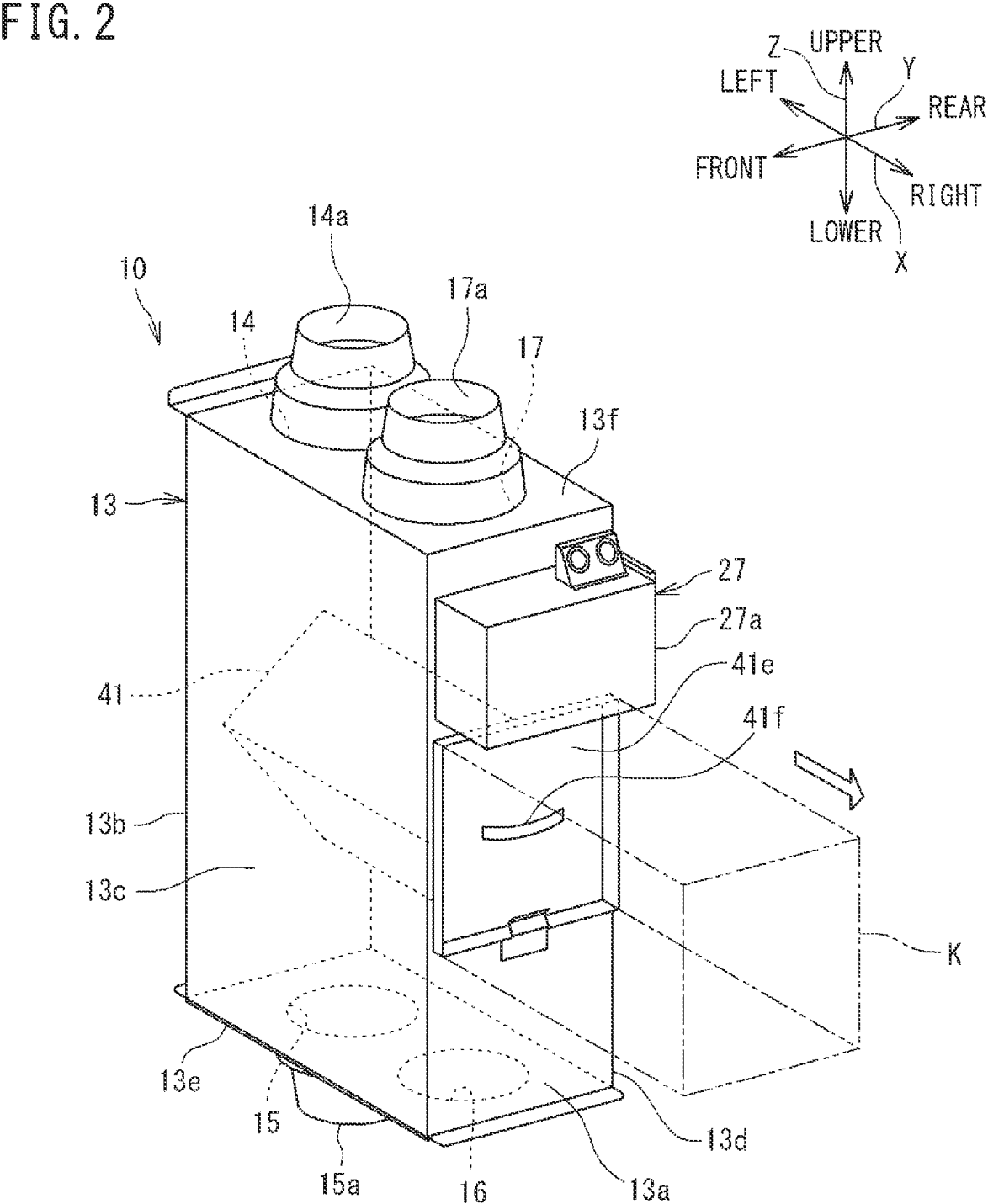
FIG. 2 is a perspective view of a ventilation device main body.

FIG. 2 is a perspective view of the ventilation device main body.

The ventilation device main body 10 includes an auxiliary casing (a second casing) 13 having a rectangular parallelepiped box shape. The auxiliary casing 13 substantially has an accommodation space S for accommodating an air supply fan 42, an exhaust fan 43, and a total heat exchanger 41, which will be described later (see FIG. 3). The auxiliary casing 13 includes a bottom plate 13e, a top plate 13f, a right side plate 13a, a left side plate 13b, a front side plate 13c, and a rear side plate 13d. The bottom plate 13e and the top plate 13f each have a rectangular shape in plan view and are opposite to each other with a spacing in between in the up-and-down direction. The right side plate 13a, the left side plate 13b, the front side plate 13c, and the rear side plate 13d connect the four sides of the bottom plate 13e and the four sides of the top plate 13f, respectively.

An electric component unit 27 is mounted to an upper portion of the right side plate 13a. The electric component unit 27 includes a box 27a and electric components, such as a control board and a terminal block, accommodated in the box 27a. The electric component unit 27 may alternatively be mounted to one of the other side plates 13b, 13c, and 13d.

The top plate 13f of the auxiliary casing 13 has an auxiliary return air intake port (a first return air intake port) 14 and an auxiliary air supply port (a first air supply port) 17. A tubular body 14a and a tubular body 17a are respectively mounted to the auxiliary return air intake port 14 and the auxiliary air supply port 17.

The bottom plate 13e of the auxiliary casing 13 serves as a partition defining a lower end of the accommodation space S for accommodating the air supply fan 42, the exhaust fan 43, and the total heat exchanger 41. The bottom plate 13e of the auxiliary casing 13 has an auxiliary outside air intake port (a first outside air intake port) 16 and an auxiliary exhaust port (a first exhaust port) 15. A tubular body 15a is mounted to the auxiliary exhaust port 15. However, the tubular body 15a is not necessarily mounted to the auxiliary exhaust port 15.

Figure 3:
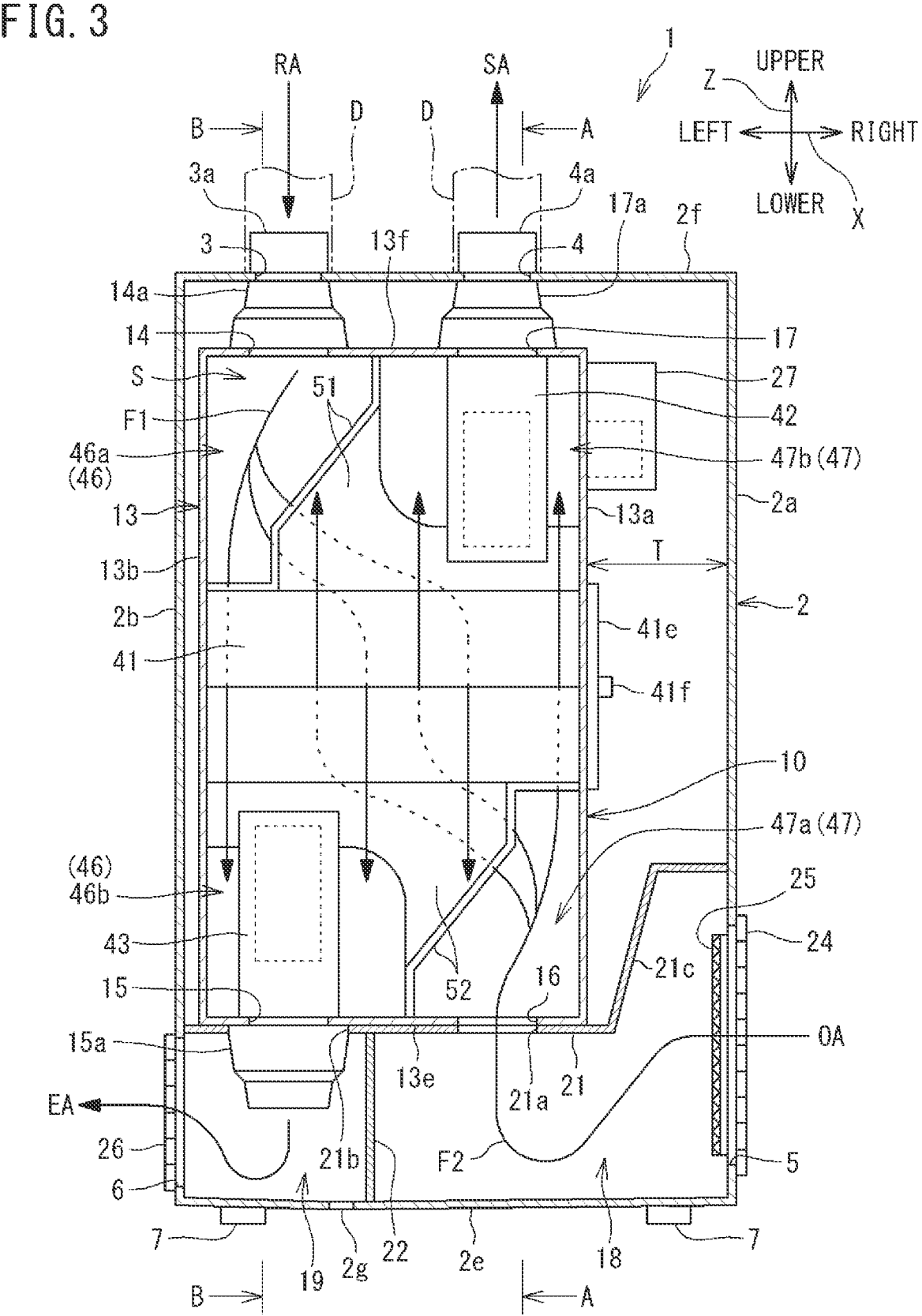
FIG. 3 is a front view schematically illustrating the inside of the ventilation device.
Figure 4:
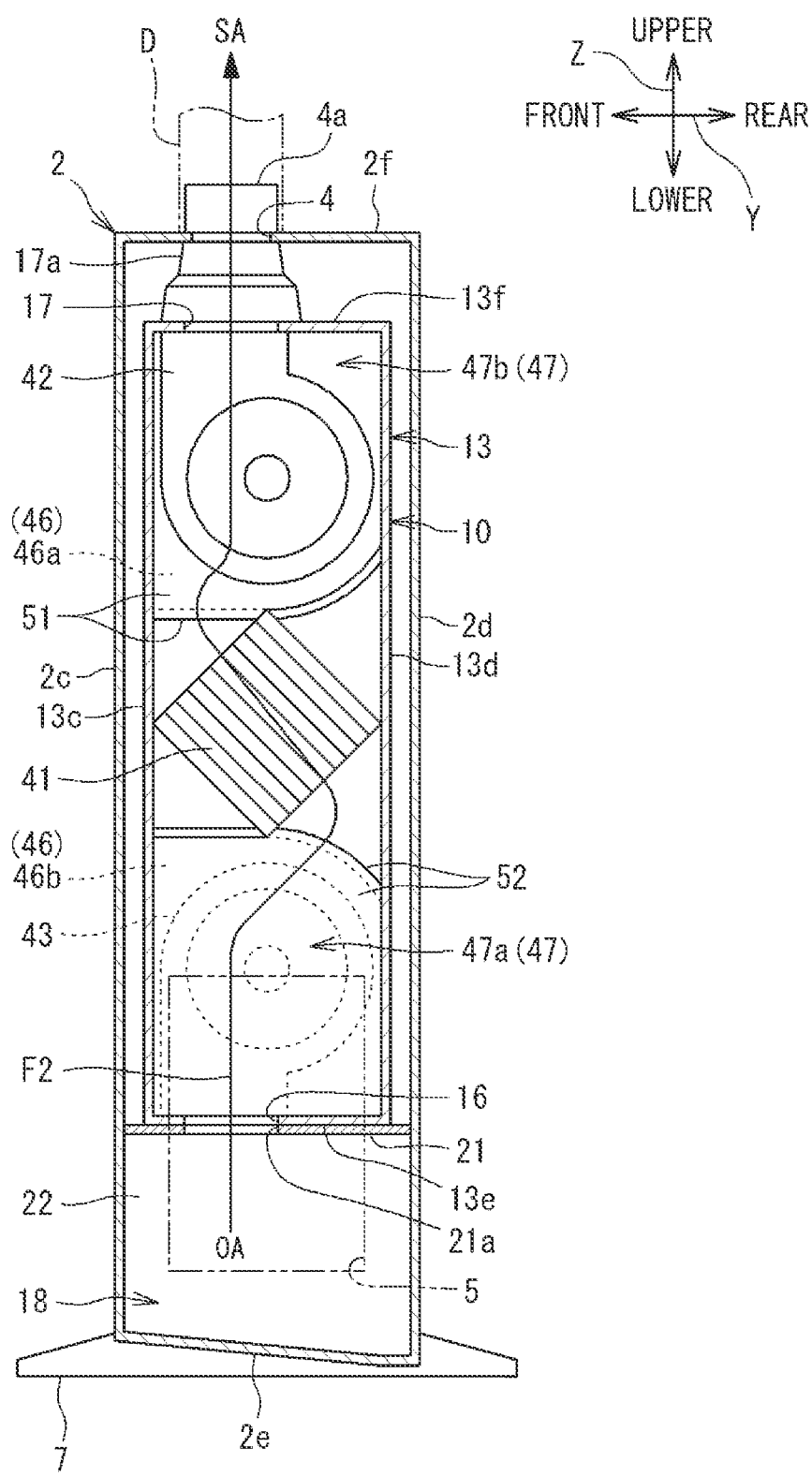
FIG. 4 is a sectional view taken along line A-A in FIG. 3.
Figure 5:
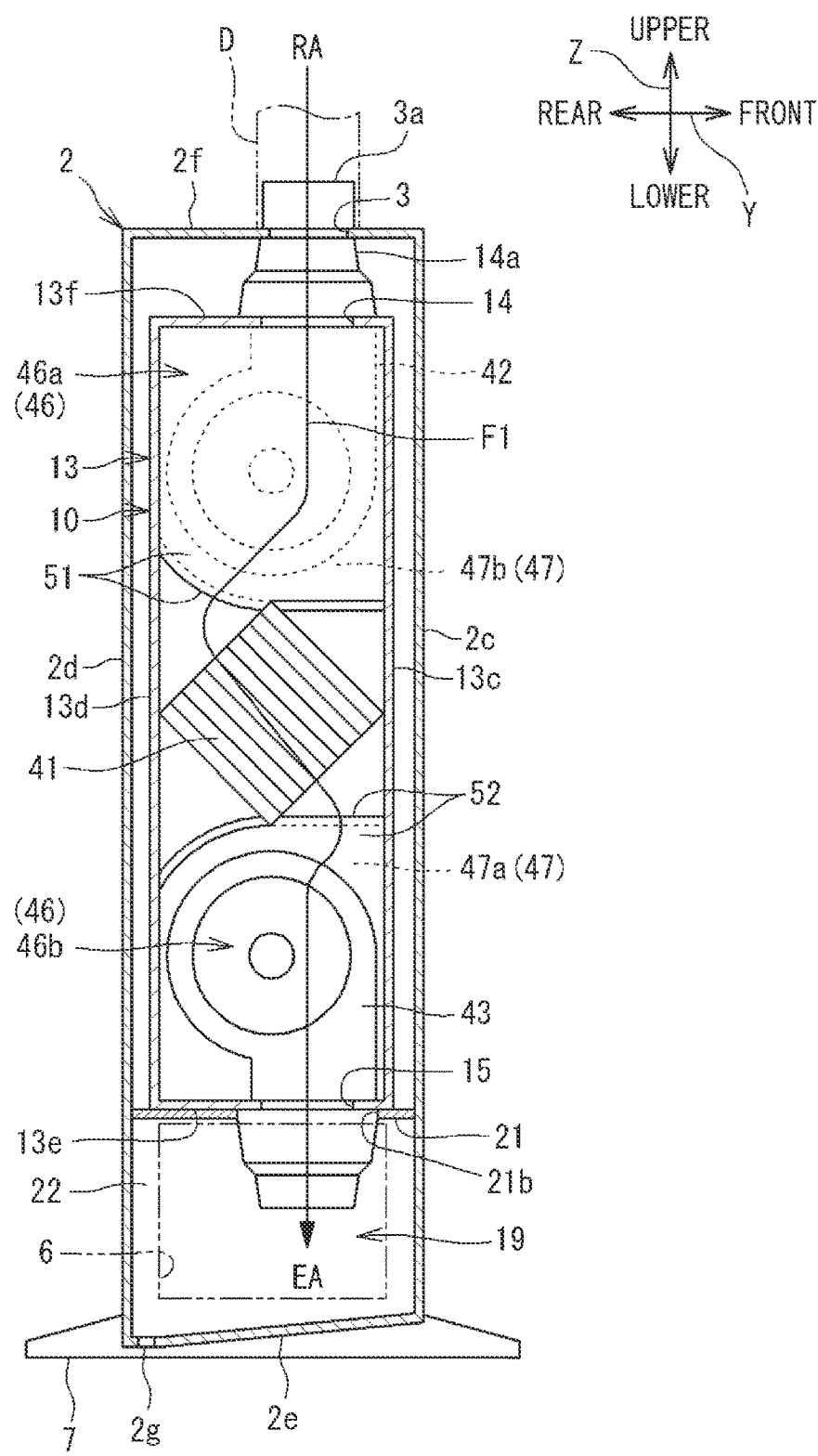
FIG. 5 is a sectional view taken along line B-B in FIG. 3.

FIG. 3 is a front view schematically illustrating the inside of the ventilation device. FIG. 4 is a sectional view taken along line A-A in FIG. 3. FIG. 5 is a sectional view taken along line B-B in FIG. 3.

The tubular bodies 14a and 17a mounted to the top plate 13f of the auxiliary casing 13 have distal ends respectively communicating with the main return air intake port 3 and main air supply port 4 in the main casing 2. Since the electric component unit 27 is mounted to the right side plate 13a of the auxiliary casing 13, a spacing T between the right side plate 13a and the right side plate 2a of the main casing 2 is wider than spacings between the other side plates of the auxiliary casing 13 and the corresponding side plates of the main casing 2. This spacing T may alternatively be secured between one of the other side plates of the auxiliary casing 13 and the corresponding one of the other side plates of the main casing 2.

A waterproof panel 21 is mounted to a lower surface of the bottom plate 3e of the auxiliary casing 13. The waterproof panel 21 is formed of, for example, a metal plate member covered with a waterproof coating or subjected to surface treatment for waterproofness, to impart waterproofness to the lower surface of the bottom plate 13e. The waterproof panel 21 covers the entire lower surface of the bottom plate 13e. The waterproof panel 21 has an opening 21a communicating with the auxiliary outside air intake port 16 and an opening 21b communicating with the auxiliary exhaust port 15. The waterproof panel 21 includes an extended portion 21c extending from the bottom plate 13e to the right side plate 2a of the main casing 2. The extended portion 21c is located in the spacing T. The extended portion 21c extends upward beyond the bottom plate 13e and reaches the right side plate 2a at a position higher than the bottom plate 13e.

The waterproof panel 21 has a length in the front-and-rear direction substantially equal to a distance between the front side plate 2c and the rear side plate 2d of the main casing 2 in the front-and-rear direction. The waterproof panel 21 has a length in the left-and-right direction substantially equal to a distance between the right side plate 2a and the left side plate 2b of the main casing 2 in the left-and-right direction. The waterproof panel 21 separates the space defined by the right side plate 2a, the left side plate 2b, the front side plate 2c, and the rear side plate 2d into two in the up-and-down direction, and suppresses intrusion of water from the space below the waterproof panel 21 into the space above the waterproof panel 21. The waterproof panel 21 may be constituted of a single member or may be constituted of a combination of multiple members.

The main casing 2 has an outside air intake chamber 18 and an exhaust chamber 19 each defined between the bottom plate (the partition) 13e of the auxiliary casing 13 and the bottom plate 2e of the main casing 2. The outside air intake chamber 18 communicates with the main outside air intake port 5 and the auxiliary outside air intake port 16. The exhaust chamber 19 communicates with the main exhaust port 6 and the auxiliary exhaust port 15. The waterproof panel 21 defines an upper end of the outside air intake chamber 18. Therefore, the waterproof panel 21 also serves as a partition in this respect. The waterproof panel 21 is capable of suppressing adhesion, to the auxiliary casing 13, water intruding into the outside air intake chamber 18 through the main outside air intake port 5.

The outside air intake chamber 18 and the exhaust chamber 19 are defined by a divider 22 in the left-and-right direction. The divider 22 is placed with a slight clearance between the divider 22 and bottom plate 2e of the main casing 2. This clearance permits flow of water on the bottom plate 2e from the outside air intake chamber 18 to the exhaust chamber 19 and vice versa.

The main return air intake port 3 in the main casing 2 is used for taking air in the building (i.e., return air RA from the building) in the main casing 2. The auxiliary return air intake port 14 in the auxiliary casing 13 is used for taking the return air RA from the building in the auxiliary casing 13. The main exhaust port 6, exhaust chamber 19, and auxiliary exhaust port 15 are used for discharging the return air RA in the main casing 2 and auxiliary casing 13 outdoors as exhaust air EA. The main outside air intake port 5, outside air intake chamber 18, and auxiliary outside air intake port 16 are used for taking air outside the building (i.e., outside air OA) in the main casing 2 and auxiliary casing 13. The main air supply port 4 and auxiliary air supply port 17 are used for supplying the outside air OA in the main casing 2 and auxiliary casing 13, indoors as supply air SA.

The main outside air intake port 5 extends upward beyond the partition 13e, from a range below the partition 13e in the right side plate 2a. The waterproof panel 21 extends from the lower surface of the partition 13e to a position above an upper end of the main outside air intake port 5. On the other hand, the main exhaust port 6 is defined in a range below the partition 13e in the left side plate 2b. Therefore, the main exhaust port 6 is smaller in area than the main outside air intake port 5. It should be noted that the main exhaust port 6 may extend upward beyond the partition 13e, from the range below the partition 13e, as in the main outside air intake port 5. Conversely, the main outside air intake port 5 may be defined only in the range below the partition 13e. As illustrated in FIGS. 1 and 3, the main outside air intake port 5 is covered with a protective net 24, and the main exhaust port 6 may be covered with a protective net 26. The main outside air intake port 5 is further covered with a filter 25.

The bottom plate 2e of the main casing 2 has a drain port 2g. The drain port 2g is located in the exhaust chamber 19. The bottom plate 2e is tilted such that the drain port 2g becomes lowest in position. As a result, water on the bottom plate 2e flows toward the drain port 2g and then flows out of the main casing 2 through the drain port 2g.

The total heat exchanger 41, the air supply fan 42, and the exhaust fan 43 are placed in the auxiliary casing 13. In the main casing 2 and auxiliary casing 13, return air RA taken in the main casing 2 and auxiliary casing 13 through the main return air intake port 3 and auxiliary return air intake port 14 flows through the total heat exchanger 41 and then flows out of the auxiliary casing 13 through the auxiliary exhaust port 15, exhaust chamber 19, and main exhaust port 6, as exhaust air EA. Hereinafter, this flow of air is also referred to as "a first air flow F1". Outside air OA taken in the main casing 2 and auxiliary casing 13 through the main outside air intake port 5, outside air intake chamber 18, and auxiliary outside air intake port 16 flows through the total heat exchanger 41 and then flows into the building through the auxiliary air supply port 17 and main air supply port 4, as supply air SA. Hereinafter, this flow of air is also referred to as "a second air flow F2".

Figure 7:
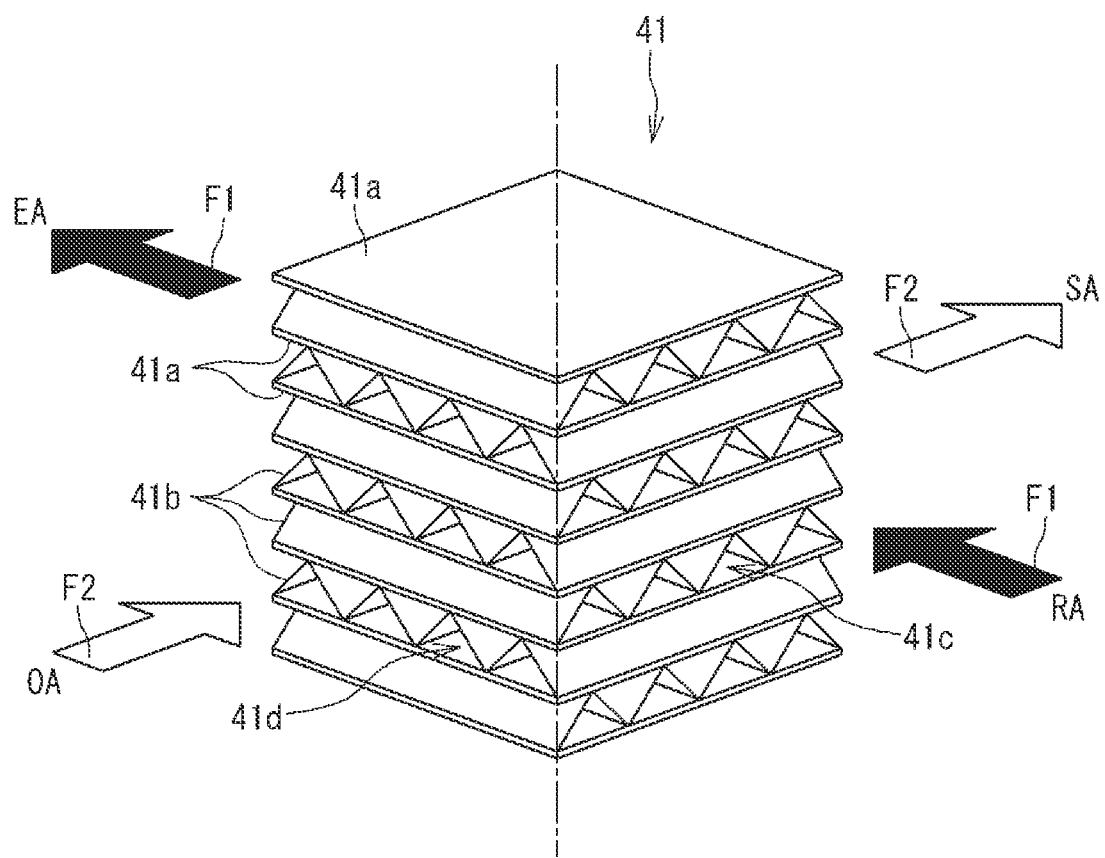
FIG. 7 is a perspective view of a total heat exchanger.

FIG. 7 is a perspective view of the total heat exchanger.

The total heat exchanger 41 according to one or more embodiments is an orthogonal total heat exchanger through which the first air flow F1 and the second air flow F2 pass substantially orthogonally. The total heat exchanger 41 includes dividers 41a and diaphragms 41b. The dividers 41a and the diaphragms 41b are stacked alternately and bonded together with an appropriate adhesive. The total heat exchanger 41 has a substantially quadrangular prism shape as a whole.

The dividers 41a each possess heat conductivity and moisture permeability and have a flat plate shape. The dividers 41a each possess a property that allows transmission of a refrigerant.

The diaphragms 41b each have a corrugated shape made up of consecutive substantially triangular sections. Each diaphragm 41b forms an air passage between adjacent two of the dividers 41a. The diaphragms 41b are stacked with their angles changed 90 degrees one by one in the direction along which the dividers 41a and diaphragms 41b are stacked. As a result, an exhaust air-side passage 41c through which the first air flow F1 passes and a supply air-side passage 41d through which the second air flow F2 passes are defined orthogonally with one divider 41a sandwiched therebetween. Each divider 41a possessing heat conductivity and moisture permeability performs exchange between sensible heat and latent heat (i.e., total heat exchange) on air flowing through the exhaust air-side passage 41c and air flowing through the supply air-side passage 41d.

As illustrated in FIGS. 3 to 5, the total heat exchanger 41 divides the inside of the auxiliary casing 13 into an indoor-side region (an upper side in the auxiliary casing 13) and an outdoor-side region (a lower side in the auxiliary casing 13). As illustrated in FIGS. 3 and 5, in the auxiliary casing 13, an upstream-side exhaust air path 46a is formed upstream of the total heat exchanger 41 in the first air flow F1, and a downstream-side exhaust air path 46b is formed downstream of the total heat exchanger 41 in the first air flow F1. The upstream-side exhaust air path 46a and the downstream-side exhaust air path 46b form an exhaust air path 46 that causes the inside of the building and the outside of the building to communicate with each other via the total heat exchanger 41.

As illustrated in FIGS. 3 and 4, in the auxiliary casing 13, an upstream-side supply air path 47a is formed upstream of the total heat exchanger 41 in the second air flow F2, and a downstream-side supply air path 47b is formed downstream of the total heat exchanger 41 in the second air flow F2. The upstream-side supply air path 47a and the downstream-side supply air path 47b form a supply air path 47 that causes the inside of the building and the outside of the building to communicate with each other via the total heat exchanger 41.

As illustrated in FIG. 3, a partition wall 51 is disposed between the upstream-side exhaust air path 46a and the downstream-side supply air path 47b. A partition wall 52 is disposed between the downstream-side exhaust air path 46b and the upstream-side supply air path 47a.

As illustrated in FIGS. 3 and 5, the exhaust fan 43 is placed near the auxiliary exhaust port 15 on the downstream-side exhaust air path 46b. The exhaust fan 43, when being driven, generates the first air flow F1, so that return air RA from the building flows through the exhaust air path 46 and then flows outdoors as exhaust air EA.

As illustrated in FIGS. 3 and 4, the air supply fan 42 is placed near the auxiliary air supply port 17 on the downstream-side supply air path 47b. The air supply fan 42, when being driven, generates the second air flow F2, so that outside air OA outside the building flows through the supply air path 47 and then flows indoors as supply air SA.

A ventilating operation is carried out when the exhaust fan 43 and the air supply fan 42 are driven. Ventilation of air in the building is thus provided in such a manner that return air RA from the building is discharged from the building while outside air OA outside the building is supplied into the building. In addition, variations in temperature and humidity in the building are suppressed in such a manner that the total heat exchanger 41 performs exchange between sensible heat and latent heat on the return air RA from the building and the outside air OA outside the building.

As illustrated in FIG. 2, the total heat exchanger 41 is extractable sideward (i.e., in a direction indicated by a white arrow) from the auxiliary casing 13. The total heat exchanger 41 according to one or more embodiments includes a portion 41e protruding from the right side plate 13a, and this portion 41e is provided with a handle 41f. A worker grips the handle 41f and pulls the total heat exchanger 41 rightward (i.e., in the direction indicated by the white arrow), thereby extracting the total heat exchanger 41 from the auxiliary casing 13. In FIG. 2, reference sign K denotes a projection region of the total heat exchanger 41 extracted sideward, that is, a spatial region where the total heat exchanger 41 passes when the total heat exchanger 41 is extracted from the auxiliary casing 13. The electric component unit 27 is disposed above the projection region K of the total heat exchanger 41.

Figure 8:
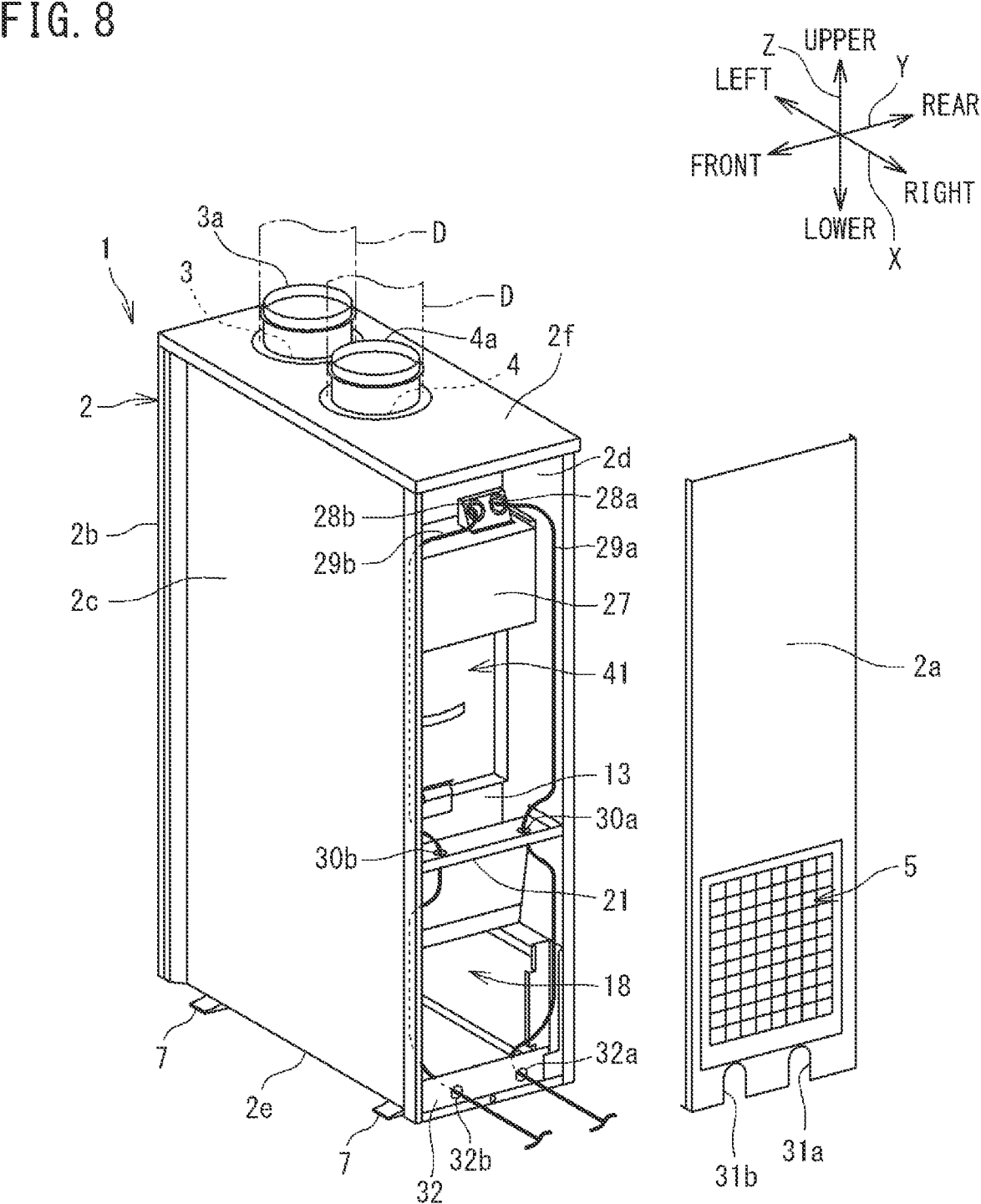
FIG. 8 is a perspective view illustrating the ventilation device from which a side plate is detached.

FIG. 8 is a perspective view illustrating the ventilation device from which a side plate is detached.

In the ventilation device 1 according to one or more embodiments, as illustrated in FIG. 8, the right side surface of the main casing 2 is opened when the right side plate 2a is detached from the main casing 2. Therefore, the total heat exchanger 41 can be extracted sideward from the auxiliary casing 13 and main casing 2 through this opening. Since the total heat exchanger 41 is extractable from the auxiliary casing 13 and the main casing 2, the total heat exchanger 41 can be maintained or replaced with a new one with ease. When the right side plate 2a of the main casing 2 is detached, the electric component unit 27 is exposed to the outside. Therefore, the electric component unit 27 can be operated or maintained with ease.

FIGS. 6A and 6B are sectional views of the main outside air intake port and its surroundings.

As illustrated in FIGS. 1 and 6A, the protective net 24 is attached to the main outside air intake port 5. The protective net 24 includes a frame member 24a having a quadrilateral shape and a net member 24b provided inside the frame member 24a. The protective net 24 is provided with the filter 25. The frame member 24a of the protective net 24 has guide grooves 24c into which front and rear end edges of the filter 25 can be inserted in the up-and-down direction.

The frame member 24a has a lower end mounted to the main casing 2 so as to be swingable on a pivot 24d in the left-and-right direction. The frame member 24a has an upper end fixed to the right side plate 2a with a fixing member (i.e., fastener) 24e. As illustrated in FIG. 6B, the fixing of the frame member 24a with the fixing member 24e is released, and the frame member 24a is swung rightward, so that upper ends of the guide grooves 24c are exposed to the outside of the main casing 2. The swinging motion of the frame member 24a is restricted with a stopper 24f of the frame member 24a abutting against the right side plate 2a. The filter 25 can be attached to and detached from the guide grooves 24c in this state.

Figure 9:
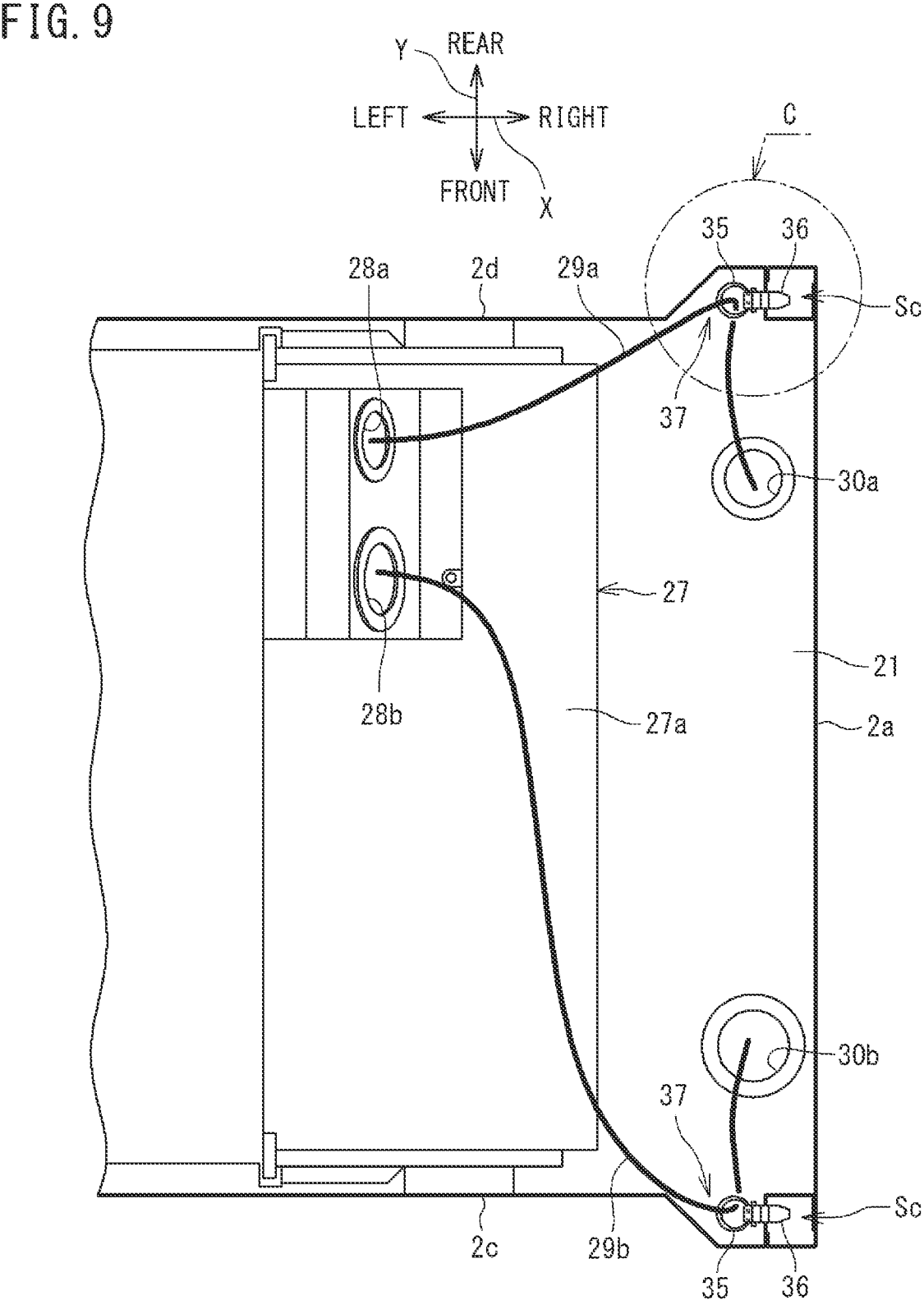
FIG. 9 is a cross-sectional view of a part of a casing and illustrates a route of a wire led out of an electric component unit.

FIG. 9 is a partial cross-sectional view (a horizontal sectional view) of the casing and illustrates a route of a wire led out of the electric component unit.

As illustrated in FIGS. 8 and 9, the electric component unit 27 has, in its upper portion, an opening 28a through which an electric wire 29a connected to an electric component in the box 27a is led out of the electric component unit 27, and an opening 28b through which an electric wire 29b connected to an electric component in the box 27a is led out of the electric component unit 27. The electric wire 29a is for low voltage and is used for signal transmission, for example. The electric wire 29a is taken out of the box through the opening 28a. The electric wire 29b is for high voltage and is used for power supply, for example. The electric wire 29b is taken out of the box 27a through the opening 28b.

The electric wires 29a and 29b connected to the electric component unit 27 are routed downward in the main casing 2. As illustrated in FIG. 1, the electric wires 29a and 29b are led out of the main casing 2 through a lower end of the right side plate 2a. The electric component unit 27 is placed at an upper side in the main casing 2 since the electric component unit 27 can be operated or maintained with ease with the right side plate 2a detached from the main casing 2. The electric wires 29a and 29b are led out of the main casing 2 through the lower end because of the following reason. If the electric wires 29a and 29b are led out of the main casing 2 through an upper side of the main casing 2, rainwater and the like may intrude into the main casing 2 along the electric wires 29a and 29b to affect the electric components in the electric component unit 27.

As illustrated in FIG. 9, the electric wires 29a and 29b are fixed to the main casing 2 with fixing members 36 and 36 disposed in the main casing 2. In the main casing 2, specifically, the front and rear side plates 2c and 2d are respectively provided with the fixing members 36 and 36 that are spaced away from each other in the up-and-down direction. The electric wires 29a and 29b are respectively fixed to the fixing members 36 and 36 with, for example, fasteners 35 and 35.

As illustrated in FIG. 8, the electric wires 29a and 29b are respectively mounted to the front and rear side plates 2c and 2d with the fixing members 36 and 36 at positions above the waterproof panel 21. At the waterproof panel 21, the electric wires 29a and 29b are respectively led into the outside air intake chamber 18 through openings 30a and 30b bored in the waterproof panel 21. As illustrated in FIG. 1, the electric wires 29a and 29b are then respectively led out of the main casing 2 through lead-out ports 31a and 31b bored in the right side plate 2a. The lead-out ports 31a and 31b are located below the projection region K (see FIG. 2) of the extracted total heat exchanger 41.

As illustrated in FIG. 8, the lead-out ports 31a and 31b each have a peripheral edge that is open downward at a lower edge of the right side plate 2a. Therefore, when the right side plate 2a is detached from the main casing 2, the electric wires 29a and 29b can be respectively pulled out through the lead-out ports 31a and 31b.

Figure 12:
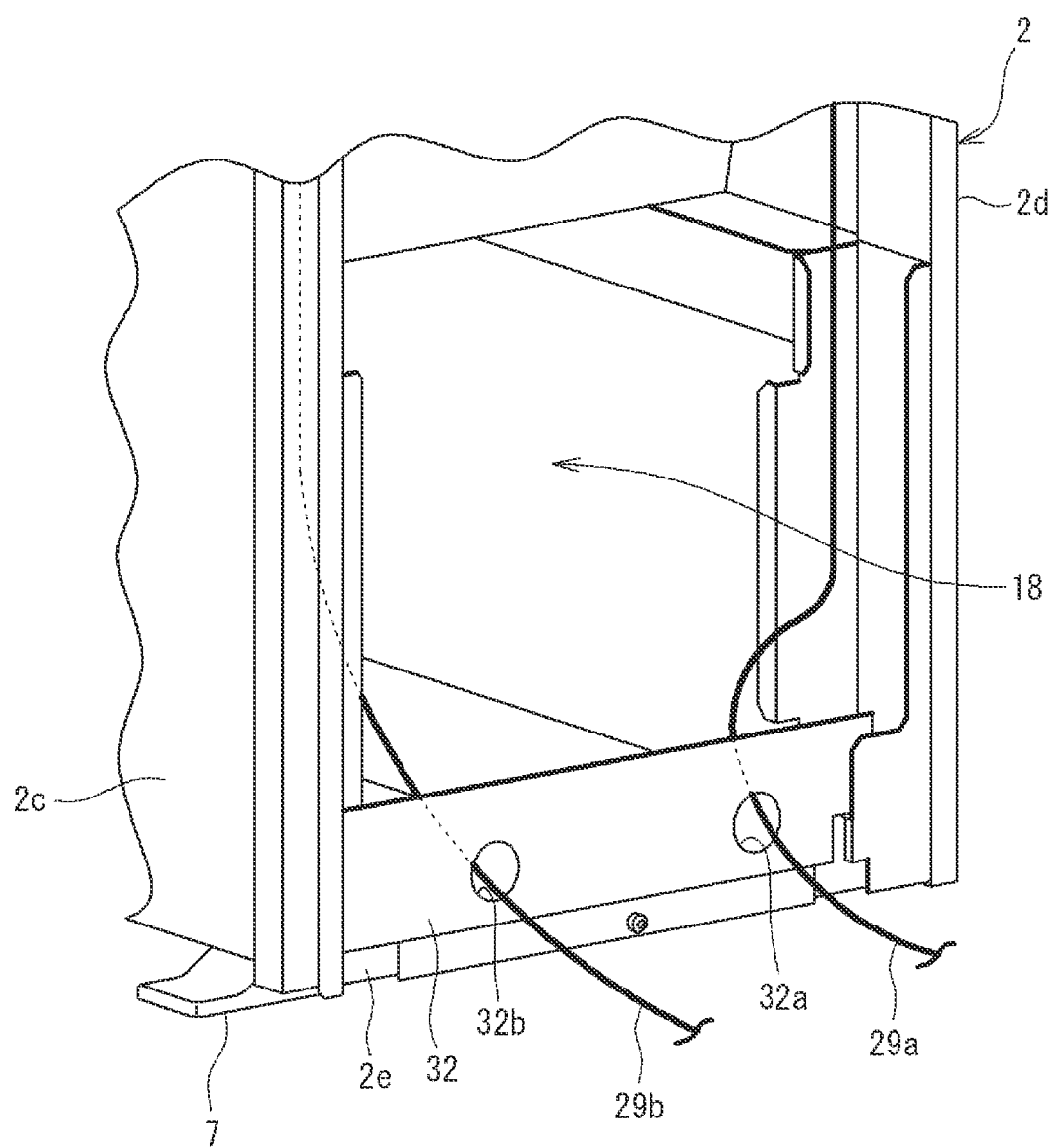
FIG. 12 is a perspective view illustrating a lower side of the casing.

FIG. 12 is a perspective view illustrating a lower side of the casing.

The main casing 2 includes a support 32 disposed near the lead-out ports 31a and 31b (see FIG. 1) and supporting the electric wires 29a and 29b. The support 32 has a plate shape and is fixed to each of the front and rear side plates 2c and 2d of the main casing 2 or a member mounted to each of the front and rear side plates 2c and 2d. The support 32 has two openings 32a and 32b through which the electric wires 29a and 29b respectively pass. Therefore, even after the right side plate 2a is detached from the main casing 2, the electric wires 29a and 29b are still supported by the support 32.

Figure 10:
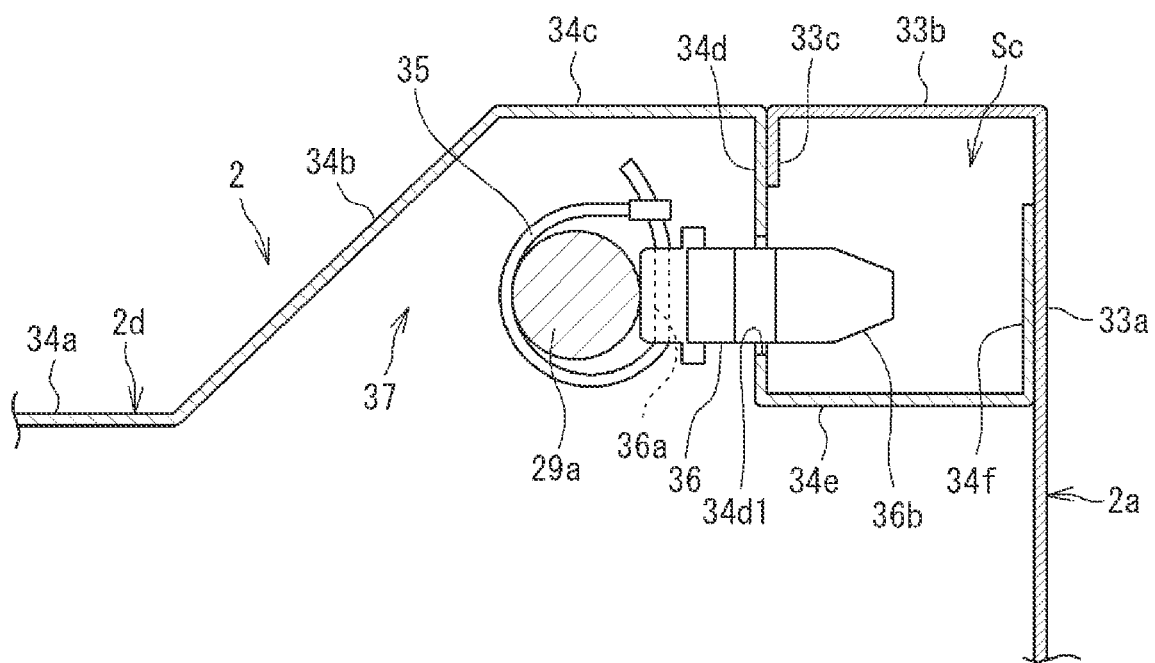
FIG. 10 is an enlarged cross-sectional view illustrating a portion C in FIG. 9.

FIG. 10 is an enlarged cross-sectional view illustrating a portion C in FIG. 9.

In the main casing 2, the right side plate 2a and the rear side plate 2d define a closed space Sc at a joint portion between the right side plate 2a and the rear side plate 2d. Specifically, the right side plate 2a includes a first flat plate portion 33a having a flat plate shape, and first and second bent portions 33b and 33c each located on a rear end of the first flat plate portion 33a The first bent portion 33b is bent leftward from the rear end of the first flat plate portion 33a. The second bent portion 33c is bent frontward from a left end of the first bent portion 33b.

The rear side plate 2d of the main casing 2 includes a second flat plate portion 34a having a flat plate shape, and third to seventh bent portions 34b to 34f each located on a right end of the second flat plate portion 34a. The third bent portion 34b is bent diagonally rearward to the right from the right end of the second flat plate portion 34a. The fourth bent portion 34c is bent rightward from a right end of the third bent portion 34b. The fifth bent portion 34d is bent frontward from a right end of the fourth bent portion 34c. The sixth bent portion 34e is bent rightward from a front end of the fifth bent portion 34d. The seventh bent portion 34f is bent rearward from a right end of the sixth bent portion 34e.

The second bent portion 33c of the right side plate 2a is in surface contact with the fifth bent portion 34d of the rear side plate 2d. Likewise, the first flat plate portion 33a of the right side plate 2a is in surface contact with the seventh bent portion 34f of the rear side plate 2d. The first flat plate portion 33a, the first bent portion 33b, the second bent portion 33c, the fifth bent portion 34d, the sixth bent portion 34e, and the seventh bent portion 34f thus define the closed space Sc having a quadrangle shape in a cross section. The closed space Sc extends from upper ends to lower ends of the right and rear side plates 2a and 2d. The closed space Sc has an upper end closed with the top plate 2f. The closed space Sc has a lower end open without being closed with the bottom plate 2e. The closed space Sc has a closed periphery that suppresses intrusion of water into the closed space Sc. Particularly since the second bent portion 33c of the right side plate 2a is in surface contact with the fifth bent portion 34d of the rear side plate 2d, water is less likely to intrude into the closed space Sc through an interface between the second bent portion 33c and the fifth bent portion 34d. Even if water intrudes into the closed space Sc through a gap between the second bent portion 33c and the fifth bent portion 34d, the closed space Sc of which the periphery is closed suppresses intrusion of the water into the main casing 2. The water in the closed space Sc is discharged from the closed space Sc through the lower end of the closed space Sc.

The rear side plate 2d defines, at its right end and inside the main casing 2, a recess 37 with the third bent portion 34b, the fourth bent portion 34c, and the fifth bent portion 34d. The electric wire 29a is placed in the recess 37. Therefore, the electric wire 29a does not protrude inward (frontward) beyond an inner side of the second flat plate portion 34a of the rear side plate 2d.

One of the fixing members 36 and 36 is disposed on the fifth bent portion 34d of the rear side plate 2d. The fixing member 36 has a hole 36a bored in its first end, and the corresponding fastener 35 such as a tie band passes through the hole 36a. The fixing member 36 includes an insertion portion 36b located at its second end, and the insertion portion 36b is inserted in an opening 34d1 bored in the fifth bent portion 34d. The first end of the fixing member 36 is located in the main casing 2 (specifically, in the recess 37). The second end of the fixing member 36 is located in the closed space Sc. Since the intrusion of water into the closed space Sc is suppressed as described above, intrusion of the water into the main casing 2 through the opening 34d1 in the fifth bent portion 34d is also suppressed.

As illustrated in FIG. 9, a closed space Sc similar to that described above is defined at a joint portion between the right side plate 2a and the front side plate 2c. The right side plate 2a includes, at its front end, a first flat plate portion and first and second bent portions that are respectively symmetrical with the first flat plate portion 33a and first and second bent portions 33b and 33c in the front-and-rear direction. The front side plate 2c includes, at its right end, a second flat plate portion and third to seventh bent portions that are respectively symmetrical with the second flat plate portion 34a and third to seventh bent portions 34b to 34f in the front-and-rear direction. The front side plate 2c defines, at its right end and inside the main casing 2, a recess 37 that is symmetrical with the recess 37 defined by the rear side plate 2d, in the front-and-rear direction. The electric wire 29b fixed with the corresponding fixing member 36 is placed in the recess 37 defined by the front side plate 2c.

Figure 11:
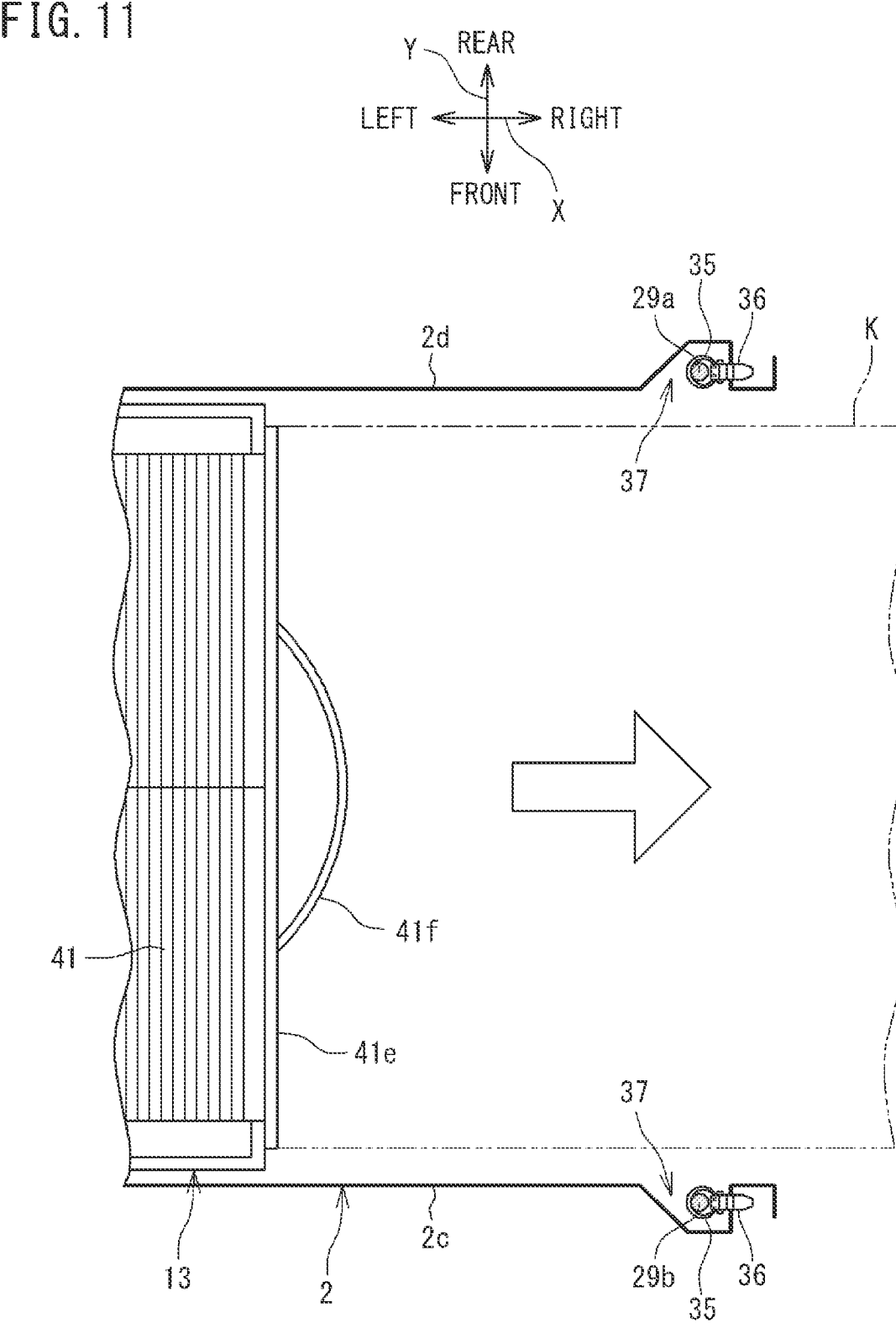
FIG. 11 is a cross-sectional view illustrating a track (a projection region) of a total heat exchanger to be extracted from the casing.

FIG. 11 is a cross-sectional view (a horizontal sectional view) of the casing and illustrates a spatial region (i.e., the projection region) where the total heat exchanger extracted from the casing passes.

As described above, the worker detaches the right side plate 2a from the main casing 2, grips the handle 41f, and pulls the total heat exchanger 41 in the direction indicated by the white arrow, thereby extracting the total heat exchanger 41 sideward from the auxiliary casing 13 and the main casing 2. The electric wires 29a and 29b led out of the electric component unit 27 are respectively fixed to the front and rear side plates 2c and 2d of the main casing 2 with the fixing members 36 and 36 and are routed around the spatial region K where the total heat exchanger 41 passes. Therefore, the electric wires 29a and 29b do not hinder the extraction of the total heat exchanger 41.

The electric wire 29a for low voltage is fixed to the rear side plate 2d of the main casing 2 while the electric wire 29b for high voltage is fixed to the front side plate 2c of the main casing 2. As a result, the electric wire 29a for low voltage and the electric wire 29b for high voltage are routed with a spacing in between in the front-and-rear direction. Therefore, the electric wire 29a for low voltage is less susceptible to an influence of noise from the electric wire 29b for high voltage.

OTHER EMBODIMENTS

The main outside air intake port 5 may be bored in one of the left side plate 2b, front side plate 2c, and rear side plate 2d of the main casing 2. The main exhaust port 6 may be bored in one of the right side plate 2a, front side plate 2c, and rear side plate 2d of the main casing 2. The positional relationship between the main outside air intake port 5 and the main exhaust port 6 is not limited unless outside air and exhaust air are mixed together.

The ventilation device 1 does not necessarily include the auxiliary casing 13. For example, the accommodation space S, the outside air intake chamber 18, the exhaust chamber 19, and the like may be defined in such a manner that the inside of the main casing 2 is divided by a partition.

The main casing 2 does not necessarily have the outside air intake chamber 18 and the exhaust chamber 19.

In the foregoing embodiments, the total heat exchanger 41 is extractable rightward from the main casing 2. The total heat exchanger 41 may alternatively be extractable leftward, frontward, or rearward. In this case, one of the side plates 2b to 2d is designed to be detachable from the main casing 2 so as to define an opening through which the total heat exchanger 41 is extractable. Also in this case, an end of the detachable one of the side plates 2b to 2d may be designed to be identical in configuration with the end of the right side plate 2a, and ends of the side plates adjacent thereto may be designed to be identical in configuration with the ends of the front and rear side plates 2c and 2d, so that a closed space Sc is defined by these ends. An opening through which the total heat exchanger 41 is extracted from the main casing 2 is not limited to the opening defined in such a manner that one of the side plates 2a to 2d is entirely detached from the main casing 2 as described in the foregoing embodiments. For example, such an opening may be bored in one of the side

[Action and Effects of Embodiments]

The heat exchanger of the ventilation device is contaminated or deteriorated due to air flowing therethrough. Therefore, the heat exchanger needs to be extracted from the casing for periodical maintenance or replacement. In the casing of the ventilation device, electric wires are routed. Therefore, it is necessary to route the electric wires so as not to hinder the extraction of the heat exchanger. In the ventilation device disclosed in Patent Literature 1, however, no consideration is given to the extraction of the heat exchanger and the routing of the electric wires.

Therefore, one or more embodiments of the present disclosure provide a ventilation device that enables extraction of a heat exchanger from a casing without hindrance of an electric wire routed in the casing.

(Action and Effects)

(1) The ventilation device 1 according to the foregoing embodiments is designed to be installed outdoors. The ventilation device 1 includes the casing 2, the total heat exchanger 41 accommodated in the casing 2 and configured to perform heat exchange between outdoor air flowing indoors and indoor air flowing outdoors, the electric component unit 27 accommodated in the casing 2, and the fixing member 36, 36 fixing, to the casing 2, the electric wire 29a, 29b connected to the electric component unit 27. The heat exchanger 41 is extractable sideward from the casing 2. The electric component unit 27 is disposed above the projection region K of the total heat exchanger 41 extracted from the casing 2. The casing 2 has the lead-out port 31a, 31b through which the electric wire 29a, 29b is led out of the casing 2, the lead-out port 31a, 31b located below the projection region K. The fixing member 36, 36 is disposed between the electric component unit 27 and the lead-out port 31a, 31b to fix the electric wire 29a, 29b routed around the projection region K. The ventilation device 1 according to this configuration therefore enables extraction of the total heat exchanger 41 from the casing 2 without hindrance of the electric wire 29a, 29b routed in the casing 2.

(2) In the ventilation device 1 according to the foregoing embodiments, the casing 2 includes the first side plate (the right side plate) 2a detachable from the casing 2, and the casing 2 has the opening through which the total heat exchanger 41 is extracted from the casing 2, the opening being formed when the first side plate 2a is detached from the casing 2. According to this configuration, the total heat exchanger 41 can be extracted from the casing 2 in such a manner that the first side plate 2a is detached from the casing 2.

(3) In the ventilation device 1 according to the foregoing embodiments, the casing 2 further includes the second side plate (the front side plate, the rear side plate) 2c, 2d adjacent to the first side plate 2a, and the second side plate 2c, 2d defines, inside the casing 2, the recess 37 extending in the up-and-down direction and accommodating the electric wire 29a, 29b. The electric wire 29a. 29b accommodated in the recess 37 is less likely to hinder extraction of the total heat exchanger 41 from the casing 2.

(4) In the ventilation device 1 according to the foregoing embodiments, the casing 2 further includes the second side plate 2c. 2d adjacent to the first side plate 2a, and the first side plate 2a and the second side plate 2c, 2d define the closed space Sc at the joint portion between the first side plate 2a and the second side plate 2c, 2d in the cross section of the casing 2. According to this configuration, even when water intrudes into the casing 2 through the joint portion between the first side plate 2a and the second side plate 2c, 2d, the water can be retained in the closed space Sc. This configuration thus suppresses adhesion of the water to the electric component unit 27 and electric wire 29a. 29b in the casing 2.

(5) In the ventilation device 1 according to the foregoing embodiments, one of the first side plate 2a and the second side plate 2c, 2d has the end bent into the closed space Sc to come in surface contact with the plate surface of a remaining one of the first side plate 2a and the second side plate 2c, 2d, in the cross section of the casing 2. This configuration suppresses intrusion of water into the closed space Sc through the joint portion between the first side plate 2a and the second side plate 2c, 2d.

(6) In the ventilation device 1 according to the foregoing embodiments, the fixing member 36, 36 passes through the second side plate 2c, 2d, and the fixing member 36, 36 has the first end located in the closed space Sc and the second end located in the casing 2. This configuration suppresses intrusion of water into the casing 2 through the portion through which the fixing member 36, 36 passes.

(7) In the ventilation device 1 according to the foregoing embodiments, the first side plate 2a has the lead-out port 31aa, 31b, the lead-out port 31a, 31b has the peripheral edge that is partially open at the outer peripheral edge of the first side plate 2a, and the casing 2 includes the support 32 disposed near the lead-out port 31a, 31b, the support 32 supporting the electric wire 29a, 29b. According to this configuration, the electric wire 29a. 29b can be pulled out through the open peripheral edge of the lead-out port 31a. 31b in detaching the first side plate 2a from the casing 2. In addition, the electric wire 29a, 29b can be fixed to the casing 2 with the support 32 even in the state in which the first side plate 2a is detached from the casing 2.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1 ventilation device
2 casing 2a right side plate (first side plate)
2c front side plate (second side plate)
2d rear side plate (second side plate)
27 electric component unit
29a electric wire
29b electric wire
31a lead-out port
31b lead-out port
32 support
36 fixing member
37 recess
41 total heat exchanger
K projection region
Sc closed space

What is claimed is:

1. A ventilation device to be installed outdoors, the ventilation device comprising:
    a casing;
    a heat exchanger accommodated in the casing and configured to perform heat exchange between outdoor air flowing indoors and indoor air flowing outdoors;
    an electric component unit comprising a control board and accommodated in the casing; and
    a fastener fixing, to the casing, an electric wire connected to the electric component unit, wherein
    the heat exchanger is extractable sideward from the casing,
    the electric component unit is disposed above a projection region of the heat exchanger extracted from the casing,
    the casing comprises a lead-out port disposed below the projection region and through which the electric wire is led out of the casing,
    the fastener is disposed between the electric component unit and the lead-out port, and
    the electric wire fixed by the fastener is routed around the projection region.

2. The ventilation device according to claim 1, wherein
    the casing comprises a first side plate detachable from the casing, and
    the casing has an opening through which the heat exchanger is extracted from the casing and that is formed when the first side plate is detached from the casing.

3. The ventilation device according to claim 2, wherein
    the casing further comprises a second side plate adjacent to the first side plate, and
    the second side plate defines, inside the casing, a recess extending in an up-and-down direction and accommodating the electric wire.

4. The ventilation device according to claim 2, wherein
    the first side plate comprises the lead-out port,
    the lead-out port has a peripheral edge that is partially open at an outer peripheral edge of the first side plate, and
    the casing comprises a support disposed near the lead-out port and that supports the electric wire.

5. A ventilation device to be installed outdoors, the ventilation device comprising:
    a casing;
    a heat exchanger accommodated in the casing and configured to perform heat exchange between outdoor air flowing indoors and indoor air flowing outdoors;
    an electric component unit accommodated in the casing; and
    a fastener fixing, to the casing, an electric wire connected to the electric component unit, wherein
    the heat exchanger is extractable sideward from the casing,
    the electric component unit is disposed above a projection region of the heat exchanger extracted from the casing,
    the casing comprises a lead-out port disposed below the projection region and through which the electric wire is led out of the casing,
    the fastener is disposed between the electric component unit and the lead-out port,
    the electric wire fixed by the fastener is routed around the projection region,
    the casing comprises:
        a first side plate detachable from the casing; and
        a second side plate adjacent to the first side plate,
    the casing has an opening through which the heat exchanger is extracted from the casing and that is formed when the first side plate is detached from the casing, and
    the first side plate and the second side plate define a closed space at a joint of the first side plate and the second side plate in a cross section of the casing.

6. The ventilation device according to claim 5, wherein one of the first side plate and the second side plate has an end that is bent into the closed space and that comes in surface contact with a plate surface of a remaining one of the first side plate and the second side plate, in the cross section of the casing.

7. The ventilation device according to claim 5, wherein
    the fastener passes through the second side plate, and
    the fastener has:
        a first end in the closed space; and
        a second end in the casing.

8. The ventilation device according to claim 5, wherein
    the first side plate comprises the lead-out port,
    the lead-out port has a peripheral edge that is partially open at an outer peripheral edge of the first side plate, and
    the casing comprises a support disposed near the lead-out port and that supports the electric wire.

* * * * *